Nov. 2, 1948.  A. BUTCHER  2,452,991
LIQUID CLARIFYING APPARATUS
Filed June 19, 1945  3 Sheets-Sheet 1
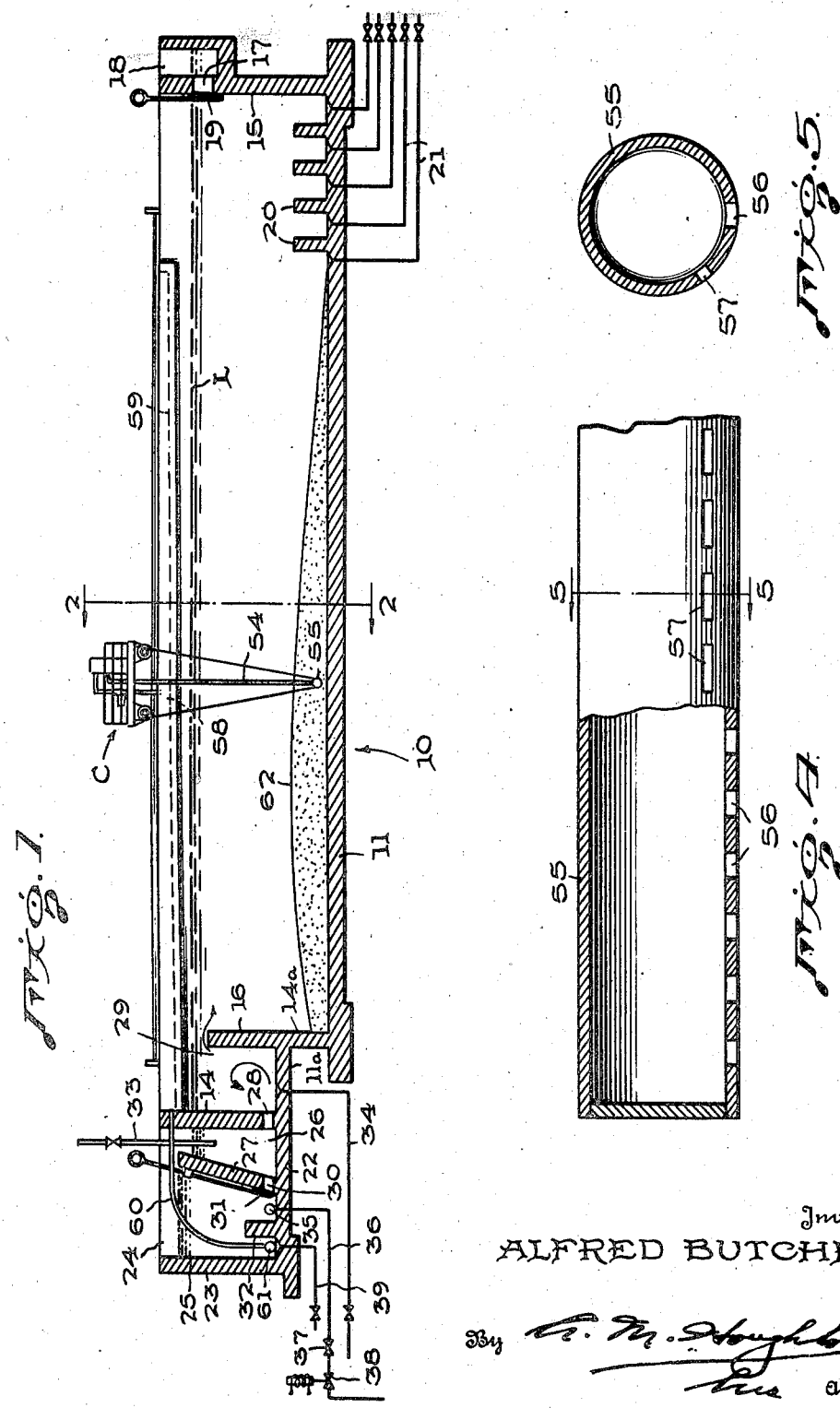
Inventor
ALFRED BUTCHER

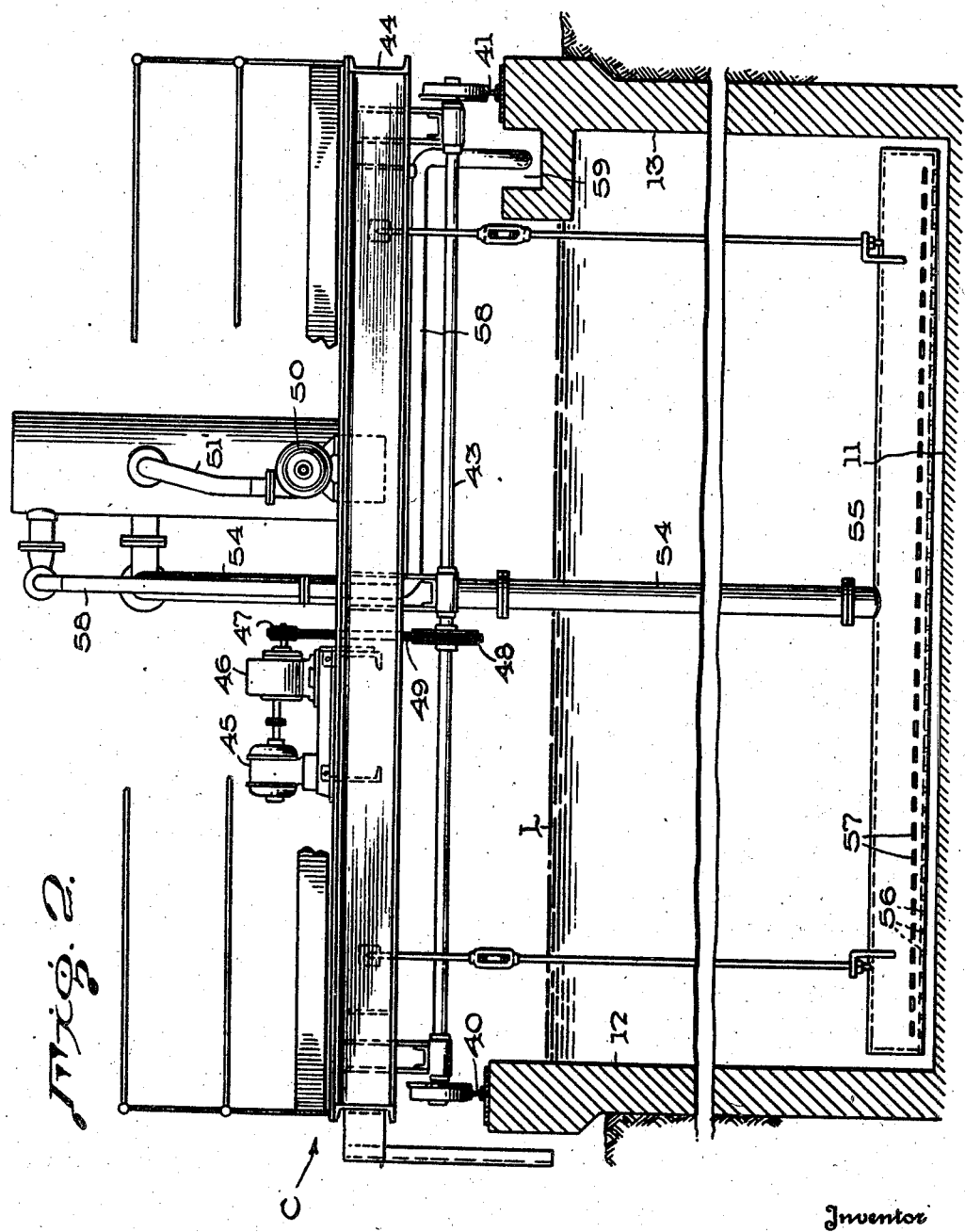

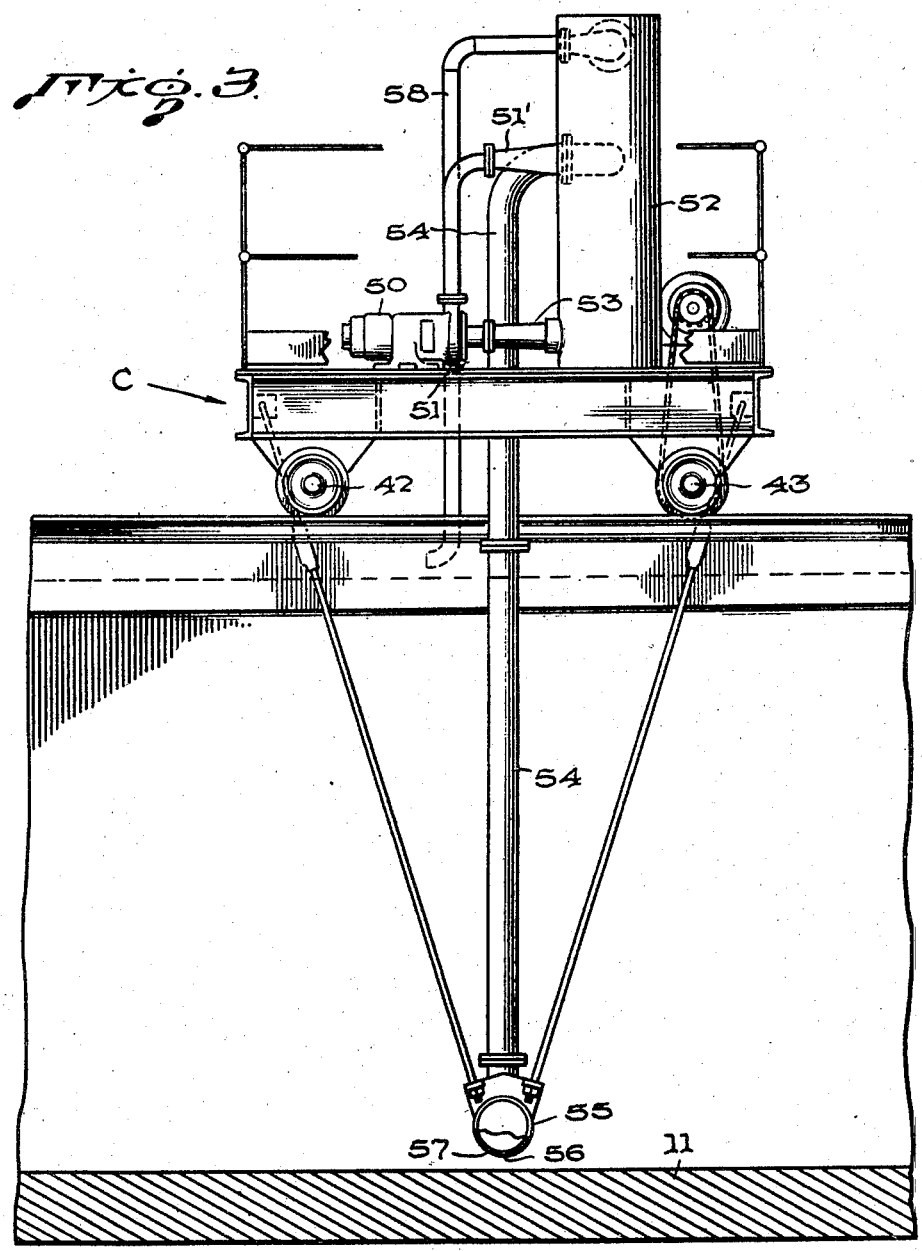

Patented Nov. 2, 1948

2,452,991

UNITED STATES PATENT OFFICE 2,452,991

LIQUID CLARIFYING APPARATUS

Alfred Butcher, Pittsburgh, Pa., assignor to Gulf Oil Corporation, Pittsburgh, Pa., a corporation of Pennsylvania Application June 19, 1945, Serial No. 600,275

7 Claims. (Cl. 210—16)

This invention relates to liquid clarifying apparatus and in particular to apparatus for clarifying turbid water using a coagulant with subsequent settling.

An object of the invention is to accelerate floc formation by causing a current of the water being treated to produce a rolling action, whereby the mutual adsorption of the sludge particles is promoted prior to delivery to a settling chamber. Another object is to accelerate floc formation by the controlled addition to a receiving chamber for the water to be treated of previously settled sludge from a settling tank, this preferably with a subsequent rolling action for the promotion of contact. Another object, related to the last, is to provide means whereby more or less settled-out water, derived from sludge withdrawn from a settling tank, can be returned to the tank. A further object is to provide improved means for withdrawing sludge from a settling tank using a pump carriage traversable over the tank.

These and other objects are attainable in the use of the apparatus shown by way of example in the accompanying drawings in which Figure 1 is a vertical, longitudinal section of an installation in accordance with the invention, the carriage appearing in elevation, Figure 2 is an enlarged section substantially on the line 2—2 of Figure 1, Figure 3 is an elevation of the apparatus of Figure 2 as seen from the right of the latter figure, Figure 4 is a fragmental view partly in elevation and partly in section of a sludge collecting pipe which appears also in preceding figures, and Figure 5 is a section substantially on line 5—5 of Figure 4.

Reference numeral 10 designates generally an elongated tank having a horizontal bottom wall 11, parallel vertical side walls 12 and 13, and parallel vertical end walls 14 and 15. Adjacent wall 14, the tank bottom portion 11a is elevated somewhat above the remainder of the bottom and extends inwardly to a vertical end wall portion 14a which is extended upwardly to provide a weir 16 having a horizontal top edge. The wall 15 is provided with a draw-off sluice, here shown as an opening 17, for clear water, the sluice emptying into a trough 18. The opening 17 is shown as controlled by a gate valve 19 which is used, in the case of a battery of units emptying into the same trough 18, to cut out a unit which is not in operation. The sluice 17 is adapted to maintain a normal level, for example at L, of water therein, this level, while it may fluctuate to some extent, being above and adjacent the top of weir 16. Adjacent wall 15 a number of transverse baffles 20 are provided on the bottom to prevent sludge from traveling to and up wall 15 to the effluent opening. Reference numeral 21 designates valved drainage lines.

Wall 11a is continued outwardly of wall 14 in a wall 22 which constitutes the bottom of a tank defined by wall 14, a vertical wall 23, and side walls as at 24. This tank is divided into compartments 25 and 26 by a weir 27 which, as here shown, is inclined upwardly toward wall 14. The latter has bottom perforations 28 connecting chamber 26 with the bottom of the chamber 29 defined by walls 11a, 14 and 16. The weir 27 has bottom openings 30 adapted to connect chambers 25 and 26, the openings 30 being controllable by a gate valve 31. In the lower part of chamber 25 a short baffle 32 extends from side to side intermediate walls 23 and 27. Reference numeral 33 designates a valved pipe whereby the water to be treated and an added coagulant are fed into the receiving chamber 26.

A valved drain pipe 34 is connected into the bottom of chamber 29. A perforated pipe 35 is disposed in the bottom of chamber 25 between wall 27 and the baffle 32 and is in connection with a drain pipe 36 which leads through a control valve 37 and a solenoid valve 38, which has fully opened and fully closed positions, to disposal. Reference numeral 39 designates a drain pipe for the bottom portion of chamber 25 between wall 23 and baffle 32.

Rails 40 and 41 extend along the horizontal tops of walls 12 and 13 and are engaged by flanged wheels on axles 42 and 43, which through suitable bearings, support the frame 44 of pump car C. Mounted on the frame is an electric motor 45, which through a speed reducer 46, sprockets 47 and 48, and a chain 49, is adapted to drive the carriage in either direction. Also mounted on the frame is a self-priming pump unit comprising an electric motor 50, a pump 51 and a tank 52, the pump intake being connected through a conduit 53 into the tank and being thereby in connection with an intake pipe 54 which leads from the tank and extends downwardly to a point adjacent the bottom wall 11 substantially midway between walls 12 and 13, pipe 54 being rigidly supported by frame 44. The lower end of pipe 54 is in connection with a horizontal collecting pipe 55 which extends substantially from side wall to side wall with its lower portion close to the tank bottom, the collector pipe being rigidly positioned by means of angularly disposed tension rods which extend between the collector pipe and frame 44 and are provided with turn-buckles. The collector pipe is provided with a multiplicity of bottom openings 56 and with a multiplicity of openings 57 which are somewhat above the bottom of the pipe and on the side thereof which is toward the end wall 15. The output of the pump unit goes to the tank through a pipe 51, and thence to a conduit 58 which extends over and into a trough 59 formed at the top inside of wall 13, the trough extending substantially from the first baffle 20 to the end wall 14 and being inclined toward the latter with its lower end in connection with a discharge pipe 60 which leads to a perforated distributor pipe 61 in the bottom of compartment 25 between wall 23 and baffle 32.

Assuming that the apparatus is to be placed in operation, valve 19 is open, valve 31 is closed, and turbid water with coagulant is fed into compartment 26 and thence through openings 28, chamber 29 and over the weir 16 into the settling compartment between the weir and wall 15, the sludge precipitating to form a bed whose top may reach the contour shown by the line 62, the level L eventually being reached with the clear water passing out at 17. The velocity of the water as it flows into the chamber 29 is sufficiently high so that it will be given a turning or rolling movement on itself due to the juxtaposition of the weir 16 to the openings 28, the nature of the movement being indicated by the curved arrow. This rolling action promotes the contact of the particles and, hence, the agglomeration thereof so that floc formation is greatly promoted at this point without the use of any mechanical means. As a result of this accelerated agglomeration, precipitation is rapid after the floc passes over the weir 16. In the settling chamber the water is substantially quiescent, moving toward the overflow sluice at a rate of, say, approximately two feet per minute.

When it is desired to remove the sludge bed from the settling tank, the carriage, which is adjacent the wall 16, is started and moves toward wall 15 at a rate of, say, substantially two feet per minute, the solenoid valve 38 being simultaneously opened. As the carriage travels, the sludge is transferred to the trough 59 and thence through pipe 60 and distributor pipe 61 to the chamber 25. The discharged sludge is fairly active in movement but this movement is reduced as the top of baffle 32 is reached and the sludge drops over the baffle to be withdrawn through the collector pipe 35 and line 36 as controlled by valve 37. Eventually, the water in chamber 25 flows over the sluice or overflow existing at the top of weir 27 and drops into chamber 26 which has the lower level L. If valve 37 is completely closed, all of the sludge reaching chamber 25 is passed to chamber 26, the old sludge thus entering the receiving chamber serving to accelerate floc formation in the latter. If valve 37 is suitably opened, settled sludge is withdrawn from chamber 25 and the overflow from the latter may be more or less fully settled-out water. The system thus permits water loss to be kept low. If heavier sludge is desired in the receiving chamber, valve 31 may be opened to permit sludge movement through openings 30 into the receiving chamber, this occurring by reason of the greater head in the sludge chamber 25 than in the receiving chamber.

When the carriage has traveled a predetermined distance to the right, Figure 1, it is stopped and then returned to its starting position at the left, travel in both directions being desirably controlled by limit switches. Desirably, when the carriage reaches its righthand limit of travel it operates a switch whereby solenoid valve 38 is caused to close.

In normal operation, the valves of drainage lines 21, 34 and 39 are closed.

In the foregoing description I have given several of the preferred embodiments of my invention but it is to be understood that these are set forth by way of illustration and not in limitation thereof.

What I claim is:

1. Liquid clarifying apparatus comprising an elongated tank having side and end walls and a bottom wall, an overflow sluice positioned a substantial distance above said bottom wall and at one of said end walls, means adapted to control the rate of outflow of liquid from the tank and adapted to establish a normal liquid level in the tank, means outwardly of the other end wall defining with the latter a receiving chamber for the liquid to be treated, said other end wall being apertured at its bottom to provide an outlet from said chamber to said tank, said chamber being of sufficient volume to permit floc formation therein, means for introducing liquid to be treated into said receiving chamber, a weir extending between the side walls adjacent said other end wall and terminating upwardly at a point which is below said level established by said means for controlling rate of outflow, said weir serving to deflect upwardly the outflow from said chamber whereby said outflow is substantially rolled on itself before passing beyond said weir, the portion of said tank between said one of said end walls and said weir constituting a settling chamber, a sludge chamber outwardly of said receiving chamber having an overflow sluice to said receiving chamber above said level, means for delivering sludge from the settling chamber to the sludge chamber, and means for controllably withdrawing sludge from the bottom of said sludge chamber.

2. Liquid clarifying apparatus comprising an elongated tank having side and end walls and a bottom wall, an overflow sluice positioned a substantial distance above said bottom wall and at one of said end walls, means adapted to control the rate of outflow of liquid from the tank and adapted to establish a normal liquid level in the tank, means outwardly of the other end wall defining with the latter a receiving chamber for the liquid to be treated, said other end wall being apertured at its bottom to provide an outlet from said chamber to said tank, said chamber being of sufficient volume to permit floc formation therein, means for introducing liquid to be treated into said receiving chamber, a weir extending between the side walls adjacent said other end wall and terminating upwardly at a point which is below said level established by said means for controlling rate of outflow, said weir serving to deflect upwardly the outflow from said chamber whereby said outflow is substantially rolled on itself before passing beyond said weir, the portion of said tank between said one of said end walls and said weir constituting a settling chamber, a sludge chamber outwardly of said receiving chamber having an overflow sluice to said receiving chamber above said level, a baffle extending across the bottom of said sludge chamber, means for delivering sludge from the settling chamber to the sludge chamber at one side of said baffle, and means for controllably withdrawing sludge from the said sludge chamber at the other side of said baffle.

3. Liquid clarifying apparatus comprising an elongated tank having side and end walls and a bottom wall, an overflow sluice positioned a substantial distance above said bottom wall and at one of said end walls, means adapted to control the rate of outflow of liquid from the tank and adapted to establish a normal liquid level in the tank, means outwardly of the other end wall defining with the latter a receiving chamber for the liquid to be treated, said other end wall being apertured at its bottom to provide an outlet from said chamber to said tank, said chamber being of sufficient volume to permit floc formation therein, means for introducing liquid to be treated into said receiving chamber, a weir extending between the side walls adjacent said other end wall and terminating upwardly at a point which is below said level established by said means for controlling rate of outflow, said weir serving to deflect upwardly the outflow from said chamber whereby said outflow is substantially rolled on itself before passing beyond said weir, the portion of said tank between said one of said end walls and said weir constituting a settling chamber, a sludge chamber outwardly of said receiving chamber having an overflow sluice to said receiving chamber above said level, a baffle extending across the bottom of said sludge chamber, means for delivering sludge from the settling chamber to the sludge chamber at one side of said baffle, and a valved flow connection leading from said sludge chamber at said other side of said baffle to said receiving chamber.

4. Liquid clarifying apparatus comprising a settling tank having side and end walls and a bottom wall, an overflow sluice positioned a substantial distance above said bottom wall and at one end of said tank, means adapted to control the rate of outflow of liquid from the tank and adapted to establish a normal liquid level in said tank, a second tank at the other end of the settling tank, a weir extending across the second tank and having an upper overflow edge terminating at a point which is above said level established by said means for controlling the rate of overflow, said weir dividing said second tank into a receiving chamber for the liquid to be treated and a sludge chamber means for introducing liquid to be treated into said receiving chamber, a flow connection between the receiving chamber and the settling tank, means for delivering sludge from the settling tank to the sludge chamber, and means for controllably withdrawing sludge from the sludge chamber.

5. Apparatus according to claim 4 including a valved flow connection from the lower part of the sludge chamber to the lower part of the receiving chamber.

6. Apparatus according to claim 4 wherein an upright baffle is provided in the bottom of the sludge chamber, wherein the sludge is delivered to the sludge chamber at one side of said baffle, and wherein the sludge is withdrawn from the other side of said baffle.

7. Apparatus according to claim 4 wherein an upright baffle is provided in the bottom of the sludge chamber, wherein the sludge is delivered to the sludge chamber at one side of said baffle, wherein the sludge is withdrawn from the other side of said baffle, and wherein a valved flow connection is provided to the lower part of the receiving chamber from the sludge chamber at said other side of said baffle.

ALFRED BUTCHER.

REFERENCES CITED

The following references are of record in the file of this patent:

UNITED STATES PATENTS

| Number | Name | Date |
| --- | --- | --- |
| 730,588 | Vial | June 9, 1903 |
| 1,892,648 | Bousman | Dec. 27, 1932 |
| 1,916,460 | Bousman | July 4, 1933 |
| 2,101,081 | Lund | Dec. 7, 1937 |
| 2,110,721 | Fischer | Mar. 8, 1938 |
| 2,128,569 | Velz | Aug. 30, 1938 |
| 2,137,966 | Rankin | Nov. 22, 1938 |
| 2,204,703 | Sanders | June 18, 1940 |
| 2,242,652 | Maxwell | May 20, 1941 |
| 2,267,608 | Hawley | Dec. 23, 1941 |
| 2,317,847 | Duden | Apr. 27, 1943 |
| 2,320,512 | Daily | June 1, 1943 |

Certificate of Correction

Patent No. 2,452,991.

November 2, 1948.

ALFRED BUTCHER

It is hereby certified that errors appear in the printed specification of the above numbered patent requiring correction as follows:

Column 3, line 8, for "pipe 51" read *pipe 51'*; column 6, line 3, claim 4, after the word "chamber" insert a comma;

and that the said Letters Patent should be read with these corrections therein that the same may conform to the record of the case in the Patent Office.

Signed and sealed this 15th day of March, A. D. 1949.

[SEAL]

THOMAS F. MURPHY,
*Assistant Commissioner of Patents.*